T. J. MADDEN & J. M. KOEHLER.
SLACK ADJUSTER.
APPLICATION FILED JULY 23, 1910.

982,616.

Patented Jan. 24, 1911.
2 SHEETS—SHEET 1.

Witnesses
William Smith
C. C. Hines

Inventors
Thomas J. Madden.
John M. Koehler.
By Victor J. Evans
Attorney

T. J. MADDEN & J. M. KOEHLER.
SLACK ADJUSTER.
APPLICATION FILED JULY 23, 1910.

982,616.

Patented Jan. 24, 1911.

2 SHEETS—SHEET 2.

Witnesses
William Smith
C. C. Hines.

Inventors
Thomas J. Madden.
John M. Koehler.
By Victor J. Evans
Attorney

UNITED STATES PATENT OFFICE.

THOMAS J. MADDEN AND JOHN M. KOEHLER, OF CAIRO, ILLINOIS.

SLACK-ADJUSTER.

982,616.

Specification of Letters Patent. Patented Jan. 24, 1911.

Application filed July 23, 1910. Serial No. 573,393.

*To all whom it may concern:*

Be it known that we, THOMAS J. MADDEN and JOHN M. KOEHLER, citizens of the United States, residing at Cairo, in the county of Alexander and State of Illinois, have invented new and useful Improvements in Slack-Adjusters, of which the following is a specification.

This invention relates to a slack adjuster for the brake gearing of locomotives, tenders and cars, the main object of the invention being to provide a simple and effective construction of take-up mechanism controlled by the action of the cylinder lever of the brake gearing for automatically taking up the slack as the brake shoes wear, thus at all times maintaining the brake shoes in position for a relatively small travel to engage the wheels, insuring and permitting efficient action of the brakes in controlling a train.

A further object of the invention is to provide a slack adjuster of this character in which the parts are so constructed and arranged as to permit of the ready application of a new brake shoe at any time in a ready and convenient manner.

The invention consists of the features of construction, combination and arrangement of parts hereinafter fully described and illustrated in the claims.

Figure 1:
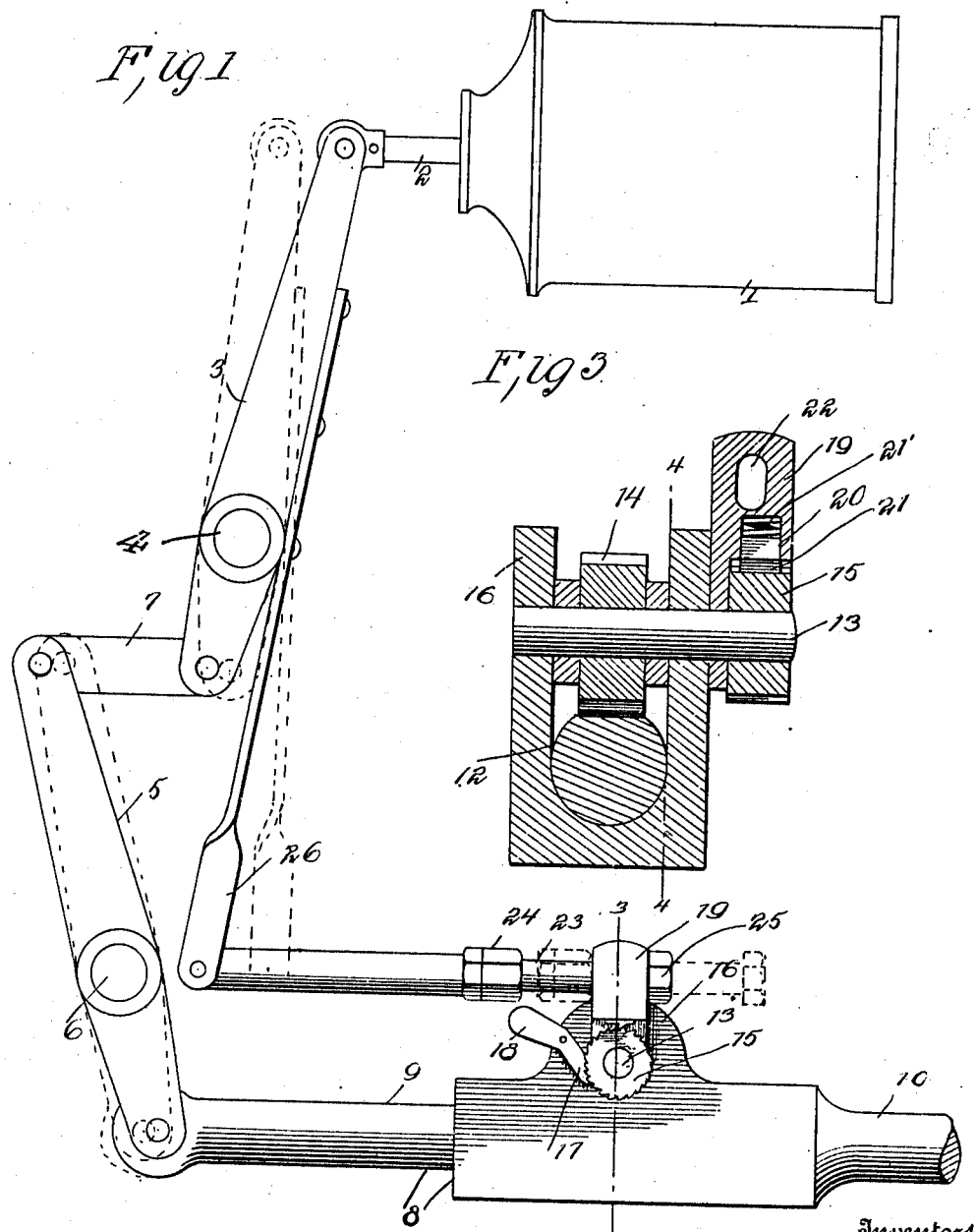
Figure 2:
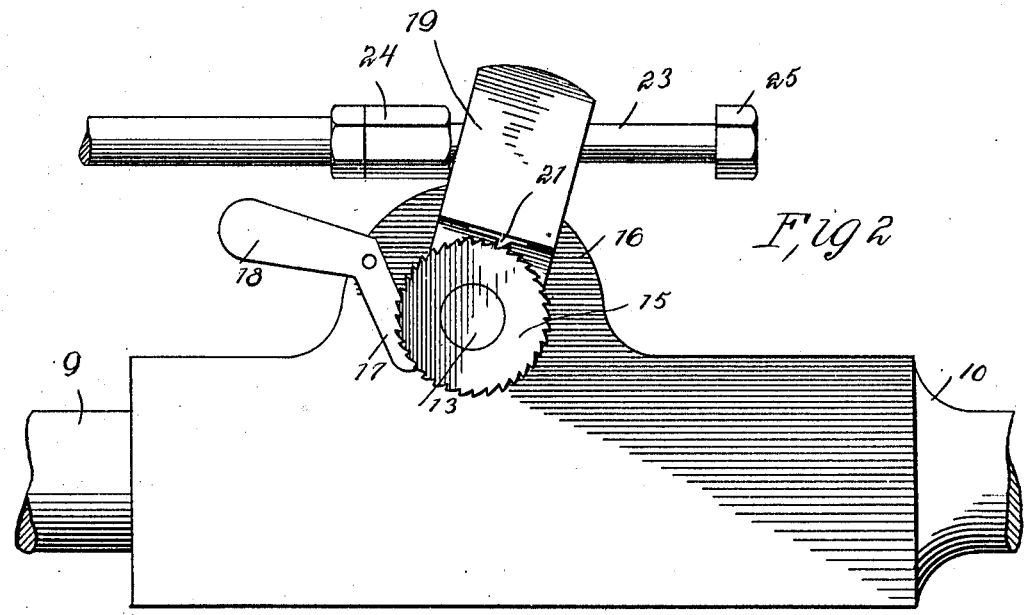
Figure 4:
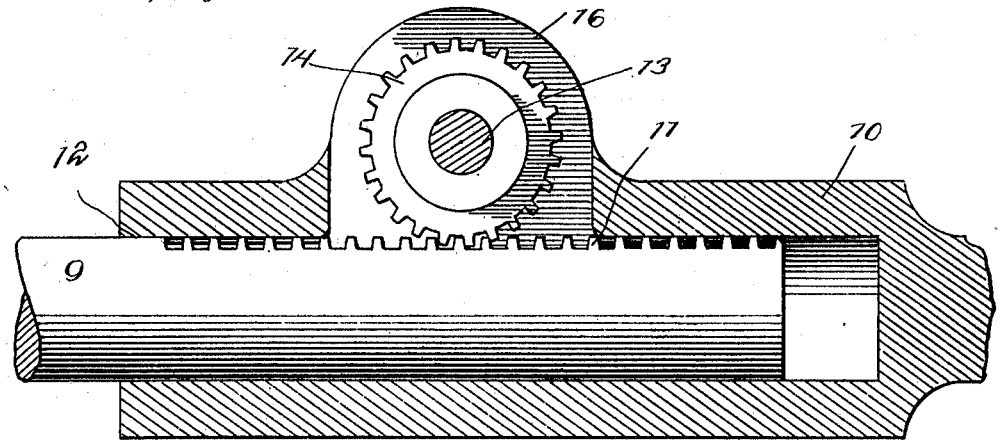

In the accompanying drawings:—Figure 1 is a top plan view of our improved slack adjuster in connection with the brake rod and lever mechanism, and showing in full lines the arrangement of the parts when the brakes are released and in dotted lines the position of the parts when the brakes are applied. Fig. 2 is a similar view showing the shifter of the take-up mechanism adjusted upon an abnormal movement of the cylinder lever to set the parts for taking up slack in the brake gearing. Fig. 3 is a horizontal transverse section on the line 3—3 of Fig. 1. Fig. 4 is a vertical transverse section on the line 4—4 of Fig. 3.

Referring to the drawing, 1 designates the brake cylinder; 2, the piston rod; 3, the cylinder lever; 4, the shaft or fulcrum on which the lever swings; 5, the transmission lever fulcrumed, as at 6, one end of said lever being connected with the free end of the lever 3 by a link 7; and 8, the brake rod, which is pivotally connected with the lever 5 and receives motion therefrom for setting and releasing the brake gear, the parts above described being of any of the well known constructions in common use.

In accordance with our invention, we construct the brake rod 8 in two parts or sections 9 and 10. The section 9 is pivoted to the lever 5 and is provided at its free end with a longitudinal series of rack teeth 11, while the section 10 is suitably connected with the brake gearing and is provided with a guide 12 in the form of a sleeve slidably receiving the rack toothed end of the section 9.

Mounted upon the sleeve 12 is a shaft 13 carrying a gear wheel or pinion 14 which meshes with the rack teeth 11 and ratchet wheel 15. The shaft 13 is journaled in the side walls 16 of a bifurcated lateral extension from the sleeve, and the gear 14 is mounted thereon between the said walls, while the ratchet wheel 15 is arranged upon the projecting upper end of the shaft. The ratchet wheel is normally engaged and held from retrograde movement by a gravity operated dog 17 having a weighted lever arm 18 by which it is normally held in locking position and may be freed or released to permit the retrograde motion of the ratchet wheel.

Pivotally mounted upon the extended end of the shaft 13 between the ratchet wheel 15 and the adjacent wall 16, is a shifter 19 having a socket 20 therein receiving a pawl 21 which projects therefrom and engages the teeth of the ratchet wheel, said pawl being normally pressed outwardly by a spring 21' and operating as a feed device for communicating motion to the gear 14 to relatively adjust the sections of the brake rod, as hereinafter described, for taking up any existing slack in the brake gearing.

The shifter 19 is provided with an opening 22 through which loosely passes the outer or forward end of a take-up rod 23 provided with spaced contacts 24 and 25 on opposite sides of the shifter, which contacts may be in the form of nuts, as shown. The rod 23 extends in parallel relation to the brake rod and is pivotally connected at its inner end to the adjacent end of a take-up bar 26, secured to the cylinder lever 3 for movement therewith, the rod 23 being thus mounted to reciprocate forward and backward on the brake applying and brake releasing movements of the lever 3.

Fig. 1 shows in full lines the position of the parts when the brakes are released, from which it will be seen that the levers 3 and 5 and the rod 23 are in retracted position with the forward stop 25 bearing against the adjacent side of the shifter 19. When the brake lever 3 is operated to apply the brakes, in which action its long and short arms respectively swing rearwardly and forwardly, motion will be transmitted through the links 7 to the brake lever 5 which will accordingly draw upon the rods 8 to set the brakes. In this movement of the brake mechanism, the bar 26 which swings with the lever 3, transmits forward motion to the take-up rod 23, the portion of which between the stops 24 and 25 travels normally loosely in the opening 22 of the shifter 19.

In practice, the extent of movement of the rod 23 without affecting the shifter 19 is dependent upon the arrangement of the spaced stops 24 and 25 and the presence or absence of slack in the brake gearing. The normal range of travel of the rod, when the brake gearing is free from slack is, as shown, in exact correspondence with the distance between the stops 24 and 25 minus the thickness or distance between the opposing contact faces of the shifter 19, so that in the normal range of travel the rod 23 will move forwardly through the shifter until the stop 24 contacts with the adjacent side of the shifter, at which time the brakes will be fully set and the position of the shifter will remain unaffected. When the brake mechanism is affected under such normal conditions, the sections of the brake rod will move as a unit rearwardly to releasing position, while the rod 23 will travel back loosely through the shifter 29 until the stop 25 comes in contact therewith, restoring the parts from the dotted to the full line positions shown in Fig. 1. If, however, there should be any slackness in the brake gearing, the increased or abnormal degree of movement of the lever 3 necessary to set the brakes will cause the stop 24 to transfer forward pivotal motion to the shifter 19, in which operation the pawl 21 will slide over the teeth of the ratchet wheel until the limit of brake applying motion is reached, as shown in Fig. 2. Upon the releasing motion of the brake gearing and the return of the parts to normal position, the rod 23 will move backwardly until the stop 25 engages the shifter 19 which will thus be restored to normal position. In such movement of the shifter back to normal position, the pawl 21 will engage the adjacent tooth of the ratchet wheel and rotate the latter rearwardly, thus transmitting motion through the shaft 13 to the gear 14 which will operate upon the rack teeth 11 and draw the sections of the rod 8 closer together, thus decreasing the effective length of the rod and taking up the slack in the brake gearing accordingly. On the described movement of the ratchet wheel, the teeth of said wheel slide over the teeth of the pawl 17, which, at the end of the feed motion of said ratchet wheel, again locks therewith and holds the same from movement.

It will thus be seen that the invention provides a simple and effective type of means controlled directly by and from the cylinder lever for automatically taking up slack which may exist in the brake gearing, thus maintaining the latter at all times in position for promptly applying the brake shoes to the wheels for a quick responsive action of the brakes. If one of the brake shoes of the brake gearing should be cast loose or become worn, a new one may be applied in lieu thereof by simply releasing the locking dog 12 and the pawl 21, whereupon the tension of the brake mechanism will draw the brake rod sections apart, thus giving sufficient slack to enable the new brake shoe to be conveniently applied. Upon then resetting the parts of the slack adjuster for operating and applying the brakes a few times, the slack will be taken up and the brake mechanism restored to normal position for operation.

Having thus described the invention, what we claim is:

1. In a slack adjuster, the combination of a cylinder lever, a brake rod operated by said lever, said rod comprising sections relatively adjustable to lengthen or shorten said rod, rack gearing connecting the rod sections for relative adjustment, a shifter controlling said gearing, a rod operated by the cylinder lever and slidably engaging said shifter, and spaced contacts on the rod for moving the shifter in opposite directions.

2. In a slack adjuster, the combination of a cylinder lever, a brake rod comprising sections relatively adjustable to lengthen or shorten said rod, means for transmitting motion to the rod from the cylinder lever, rack gearing connecting the rod sections for relative adjustment, and means controlled and actuated by the cylinder lever for actuating said rack gearing to adjust the sections of the rod relatively to each other.

3. In a slack adjuster, the combination of a cylinder lever, a brake rod actuated by said lever and comprising telescopic sections, one of said sections being provided with a rack toothed portion and the other with a guide slidably receiving said rack toothed portion, a gear upon said guide meshing with said rack toothed portion, pawl and ratchet mechanism carried by the guide for transmitting motion to said gear, and means operated and controlled by the cylinder rod for operating said pawl and ratchet mechanism.

4. In a slack adjuster for brakes, the combination of a cylinder lever, a brake rod actuated thereby and comprising sections having telescopic ends, the end of one section being provided with rack teeth and the end of the other section with a guide slidably receiving the rack toothed end of the first named section, a gear upon said guide meshing with the rack teeth, a ratchet wheel mounted for revolution with said gear, a shifter carrying a pawl meshing with said ratchet wheel, and a rod actuated by the cylinder lever and normally movable independently of the shifter, said rod being provided with contacts to engage and adjust said shifter.

5. In a slack adjuster, the combination of a cylinder lever, a brake rod actuated thereby and comprising two sections, one of said sections having a rack toothed portion and the other a guide receiving said rack toothed portion, a shaft upon the guide carrying a ratchet wheel and a gear, the latter meshing with said rack toothed portion, a shifter pivotally mounted on the guide and having an opening therein and carrying a pawl engaging the ratchet wheel, a take-up bar connected with the cylinder lever, a rod pivoted to said bar and normally movable loosely through the opening in the shifter, and spaced contacts on said rod to engage and operate said shifter.

In testimony whereof we affix our signatures in presence of two witnesses.

THOMAS J. MADDEN.
JOHN M. KOEHLER.

Witnesses:
HARRY W. SCHULZ,
J. C. CROWLEY.